(12) United States Patent  
Apostolopoulos et al.

(10) Patent No.: US 7,336,164 B2
(45) Date of Patent: Feb. 26, 2008

(54) TIRE PRESSURE MONITORING SYSTEM AND SENSOR THEREFOR

(75) Inventors: Dimi Apostolopoulos, Pittsburgh, PA (US); Stuart Heys, Pittsburgh, PA (US); James Teza, Pittsburgh, PA (US); Michael Wagner, Pittsburgh, PA (US); Donggi Kim, Daejeon-Si (KR)

(73) Assignee: Dymos Co., Ltd., Farmington Hills, MI (US)

( * ) Notice: Subject to any disclaimer, the term of this patent is extended or adjusted under 35 U.S.C. 154(b) by 146 days.

(21) Appl. No.: 11/360,950

(22) Filed: Feb. 23, 2006

(65) Prior Publication Data

US 2007/0194895 A1    Aug. 23, 2007

(51) Int. Cl.
*B60C 23/00*    (2006.01)

(52) U.S. Cl. .................. 340/447; 340/442; 340/445; 73/146.5; 116/34 R

(58) Field of Classification Search ............... 340/447, 340/442, 443, 444, 445, 446, 448; 73/146.5, 73/146.8; 116/34 R, 34 A, 34 B; 152/152.1
See application file for complete search history.

(56) References Cited

U.S. PATENT DOCUMENTS

| | | | |
|---|---|---|---|
| 2,894,246 A | 7/1959 | De Graffenried | |
| 3,602,884 A | 8/1971 | Brumbelow | |
| 4,067,235 A | 1/1978 | Markland et al. | |
| 4,103,283 A | 7/1978 | Lee | |
| 4,148,008 A | 4/1979 | Lusk et al. | |
| 4,749,993 A | 6/1988 | Szabo et al. | |
| 4,816,802 A | 3/1989 | Doerksen et al. | |
| 4,918,423 A | 4/1990 | Fukuyama et al. | |
| 5,035,137 A | 7/1991 | Burkard et al. | |
| 5,040,562 A * | 8/1991 | Achterholt ............... 137/227 |
| 5,063,774 A | 11/1991 | Burkard et al. | |
| 5,065,134 A | 11/1991 | Schmid et al. | |
| 5,134,880 A | 8/1992 | Gerhard | |
| 5,181,423 A | 1/1993 | Philipps et al. | |
| 5,181,975 A | 1/1993 | Pollack et al. | |
| 5,302,939 A * | 4/1994 | Downs et al. ............... 340/447 |
| 5,541,574 A | 7/1996 | Lowe et al. | |
| 5,635,691 A | 6/1997 | Ballyns | |
| 5,699,041 A | 12/1997 | Ballyns | |
| 5,764,138 A | 6/1998 | Lowe | |
| 5,774,047 A * | 6/1998 | Hensel, IV ............... 340/442 |
| 5,790,016 A | 8/1998 | Konchin et al. | |
| 5,900,808 A | 5/1999 | Lebo | |
| 5,939,977 A | 8/1999 | Monson | |

(Continued)

*Primary Examiner*—Anh V. La
(74) *Attorney, Agent, or Firm*—David C. Purdue; John C. Purdue

(57) ABSTRACT

A system for monitoring tire pressure and producing a first signal in the event that a low tire pressure condition has been sensed and a second, different signal in the event that a low tire pressure condition has not been sensed and a third signal in the event that the system is not operable. The system comprises a sensor for each tire and an associated transceiver antenna coil. Each sensor comprises a pressure switch and a circuit that has a first resonant frequency when the pressure switch is in a first state and a second, different resonant frequency when the switch is in a second state. An excited circuit associated with each transceiver antenna coil generates an AC electromagnetic field across the transceiver antenna coil and a detector circuit is operable to demodulate information communicated passively by the sensor that reflects its resonant frequency.

14 Claims, 6 Drawing Sheets

U.S. PATENT DOCUMENTS

| | | |
|---|---|---|
| 6,053,038 A | 4/2000 | Schramm et al. |
| 6,175,301 B1 | 1/2001 | Piesinger |
| 6,362,732 B1 | 3/2002 | Konchin et al. |
| 6,838,985 B2 | 1/2005 | Ghabra et al. |
| 6,935,169 B2 | 8/2005 | Newman et al. |

* cited by examiner

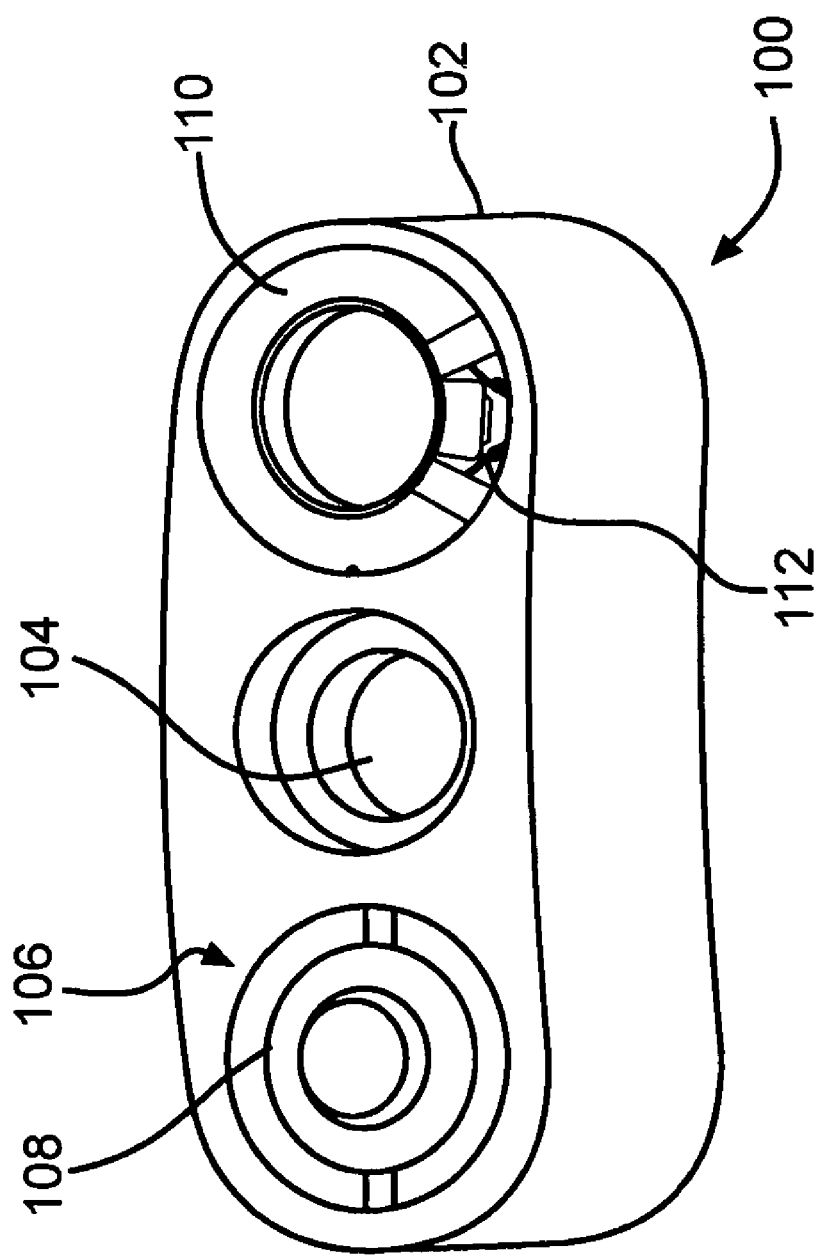

TIRE PRESSURE MONITORING SYSTEM AND SENSOR THEREFOR

BACKGROUND OF THE INVENTION

1. Field of the Invention

This invention is a system that provides for the remote sensing of a low vehicle tire pressure condition and the generation of a signal indicating the presence of the low pressure condition. This invention is also a sensor for use in the system.

2. Description of the Prior Art

Systems for remotely monitoring vehicle tire pressure were developed many decades ago and inventors have been improving on them ever since. Tire pressure monitoring systems will be required in passenger vehicles sold in the US beginning with model year 2008. The requirements for those systems are spelled out in the TREAD Act and have been known for some time.

SUMMARY OF THE INVENTION

The present invention is based on the discovery of an elegantly simple and reliable system for monitoring tire pressure and providing a signal in the event that a low tire pressure condition has been sensed or that a tire pressure sensor is not functioning. The system comprises a sensor for mounting in each tire to be monitored and an associated transceiver antenna coil that is mounted near each monitored tire. Each sensor comprises a pressure switch and a circuit that includes an antenna coil and a reference capacitor which establish a reference resonant frequency for the circuit. The circuit also includes an additional capacitor, hereinafter referred to as a condition capacitor, that is inactive when the pressure switch is in a first state and is actively connected in parallel with the reference capacitor when the pressure switch is in a second state. When the pressure switch is in the first state and the condition capacitor is inactive, the sensor circuit will have a first resonant frequency and, when the pressure switch is in the second state and the condition capacitor is actively connected in the sensor circuit, it will have a second resonant frequency that is different from the first resonant frequency. Each transceiver antenna coil is operatively associated with an exciter circuit that generates an AC electromagnetic field across the transceiver antenna coil and with a detector circuit that is operable to demodulate information communicated passively by the sensor that reflects its resonant frequency. Preferably, each transceiver antenna coil is sequentially activated so that a single sensor is interrogated or polled at a given time. In this way, a signal may be correlated with a particular tire reflecting the state of the pressure switch in the sensor on that tire.

Accordingly, it is an object of this invention to provide a reliable tire pressure monitoring system comprising a sensor and a transceiver antenna for each tire.

It is another object of the invention to provide a wheel mounted sensor that operates reliably and without power internal to the sensor such as might be provided by batteries.

It is yet another object of the invention to provide a tire pressure monitoring system that includes a sensor that cooperates with a transceiver to produce a first signal indicating that the system is operable and a second signal that indicates either that a low pressure condition has been sensed or that the system has somehow become inoperable.

It is a further object of this invention to provide a sensor including a pressure switch that is bi-stable and will change from a first state to a second state when a low tire pressure condition is detected and will remain in the second state until there is a substantial increase in the tire pressure.

These and other objects and advantages of the invention will be apparent from the following detailed description of the invention including the preferred embodiments, reference being made therein to the attached drawing figures.

BRIEF DESCRIPTION OF THE DRAWINGS

FIG. 6 is a perspective view of a multiple chambered embodiment of a sensor according to the invention.

DETAILED DESCRIPTION OF THE PREFERRED EMBODIMENTS

Figure 1:
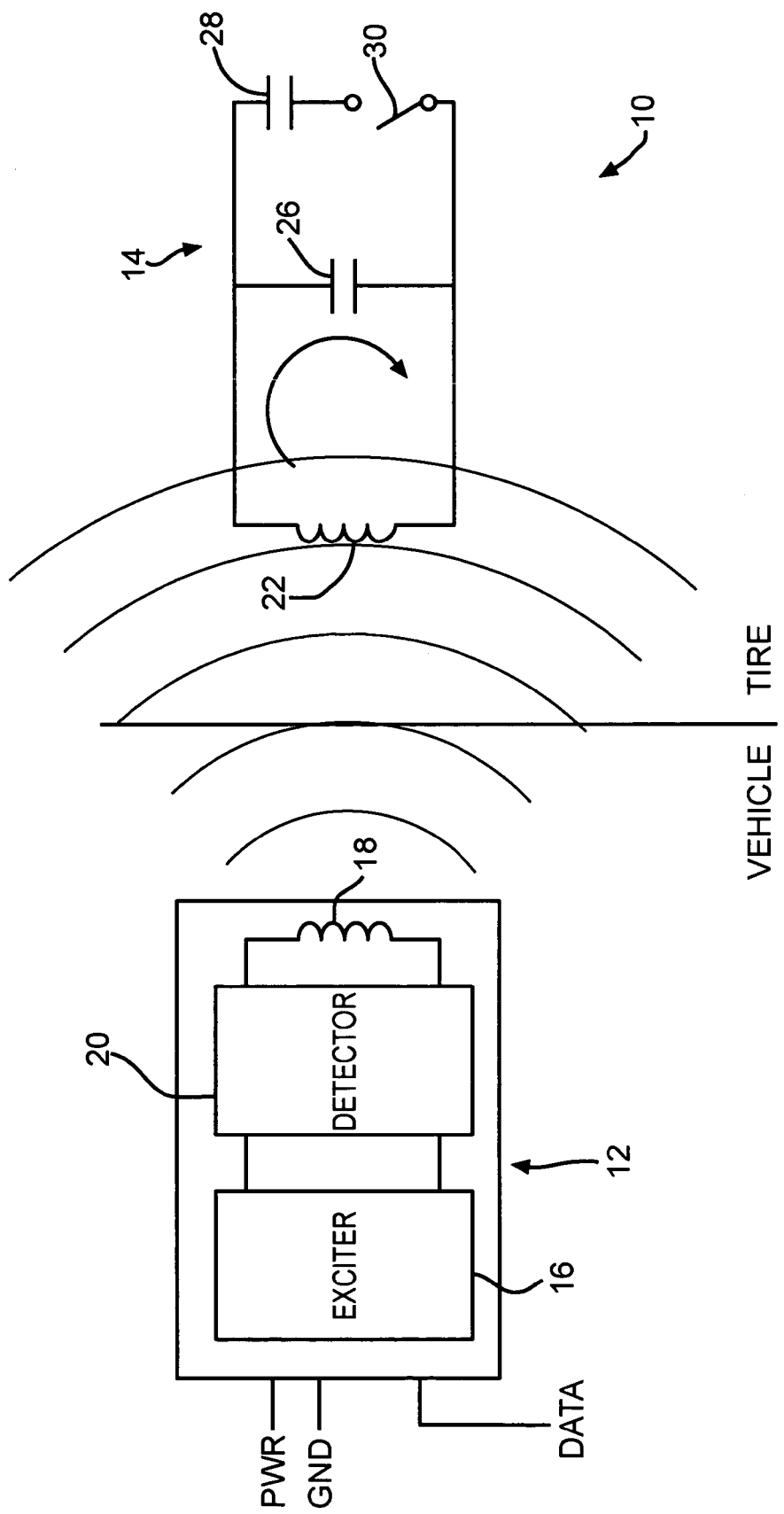
FIG. 1 is a schematic representation of a sensor and an associated transceiver according to the present invention.

Referring now in more detail to the drawing figures, FIG. 1 shows a schematic diagram of a tire pressure monitoring system according to the invention, indicated generally at 10, for a single wheel. The system 10 comprises a transceiver 12 and a sensor 14. The transceiver 12, or a portion of it, is adapted to be mounted on the vehicle, for example, in or adjacent to the wheel well associated with the tire in which the pressure is to be monitored. The sensor 14 is adapted to be mounted inside of a tire or at least associated with the tire so that a portion of the sensor is exposed to the ambient pressure inside of the tire.

The transceiver 12 comprises an exciter circuit 16 that is operable to generate an AC electromagnetic field across an antenna coil 18. The transceiver 12 further comprises a detector circuit 20 that is operable to demodulate signals produced or induced in the sensor 14.

The sensor 14 has a circuit that comprises an antenna coil 22 and a reference capacitor 26. When alternating current passes through the transceiver antenna coil 18, the sensor antenna coil 22 will be inductively coupled to the transceiver antenna coil 18 and alternating current will be induced to flow through the sensor antenna coil 22. The circuit comprising the sensor antenna coil 22 and the reference capacitor 26 will have a resonant frequency which is referred to herein as a reference resonant frequency.

The sensor circuit also includes a condition capacitor 28 and a pressure switch 30. The pressure switch 30 is bi-stable meaning that it is only stable in two distinct conditions or positions and not in between those two positions or conditions. This should not be construed to mean that the switch might not be a tri-stable switch that is stable in only three positions or a switch that is stable in more than three positions. It does mean that when the switch changes from a first state to a second state that it will remain in the second state despite relatively minor fluctuations in the ambient pressure.

Figure 2:
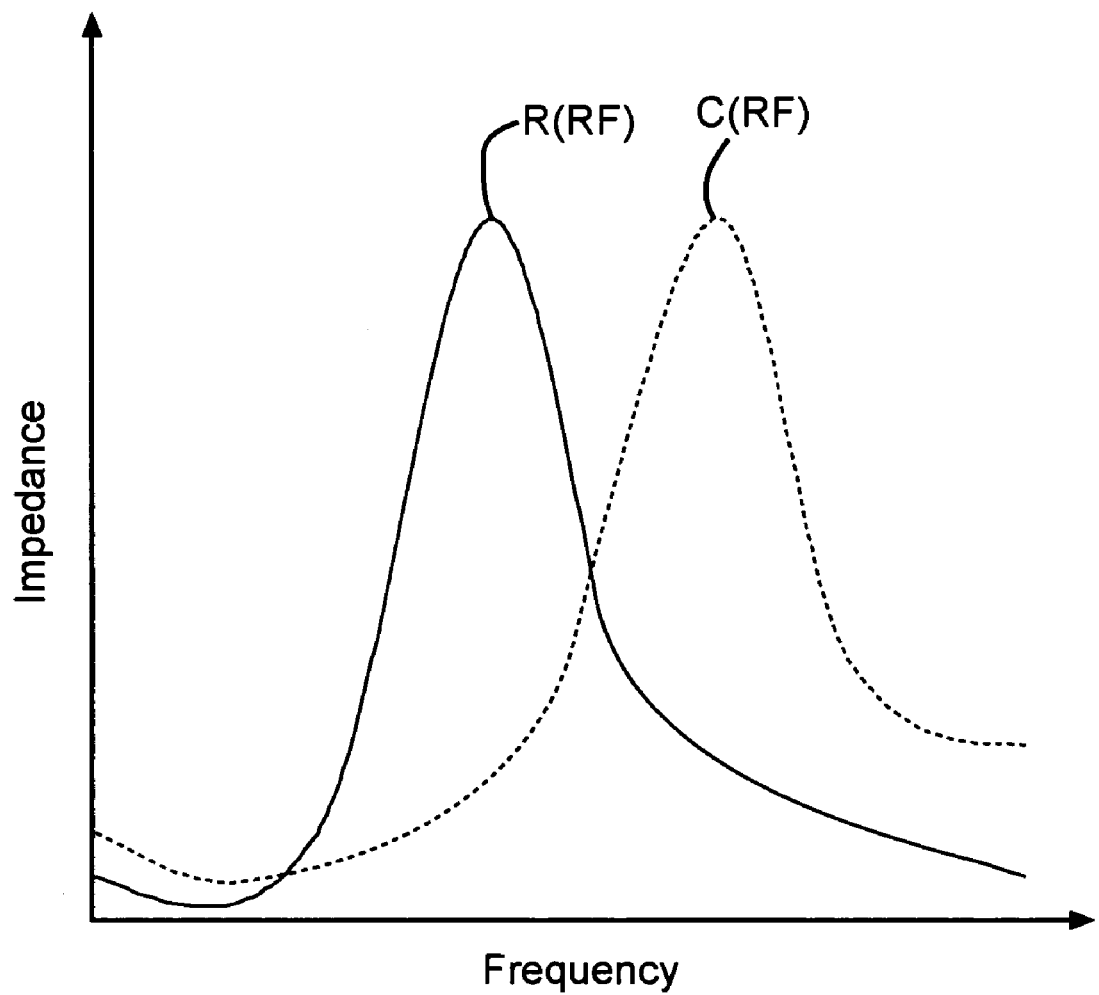
FIG. 2 is a generalized graph showing the resonant frequency of the sensor when the pressure switch is in a first state and the resonant frequency of the sensor when the pressure switch is in a second state.

When the pressure switch 30 is in a first state, the condition capacitor 28 is inactive and inoperable in the sensor circuit and does not affect the resonant frequency of the sensor circuit. In this embodiment, when the pressure switch 30 is in the first state, the resonant frequency of the sensor circuit will be a condition resonant frequency. When the pressure switch 30 is in a second state, the condition capacitor 28 is actively connected in parallel with the reference capacitor 26, the resonant frequency of the sensor circuit will be the reference resonant frequency and that will be different than the condition resonant frequency. This is shown, in general terms, in the plots in FIG. 2. The solid line plot is a stylized representation of the impedance of the sensor circuit with the pressure switch 30 in the second state and the condition capacitor 28 in parallel with the reference capacitor 26, at various frequencies. The sensor circuit with the condition capacitor 28 connected in parallel with reference capacitor 26 has a Reference resonance frequency R(RF), which is the frequency at which the impedance of the circuit is highest. This Reference resonant frequency C(RF) is detectable by the transceiver 12 and provides a positive indication that the transceiver 12 and the sensor 14 are operative and that the pressure switch 30 is in the second state. When the pressure switch 30 is in its first state and the condition capacitor 28 is out of the sensor circuit and not in parallel with the reference capacitor 26, the resonant frequency of the sensor circuit will be, for example, as shown in FIG. 2, a Condition resonant frequency R(RF) shown in a dashed line in FIG. 2. The Reference resonant frequency R(RF) will be lower than the Condition resonant frequency C(RF) in the case where the pressure switch 30 is open and the condition capacitor 28 is not in the sensor circuit in parallel with the reference capacitor 26. A frequency detector in the detector 20 can detect the frequency of the signal resulting from the induced current flowing in the sensor circuit and thereby provide a signal indicating whether the resonant frequency coincides with the Reference resonant frequency or the Condition resonant frequency.

Figure 3:
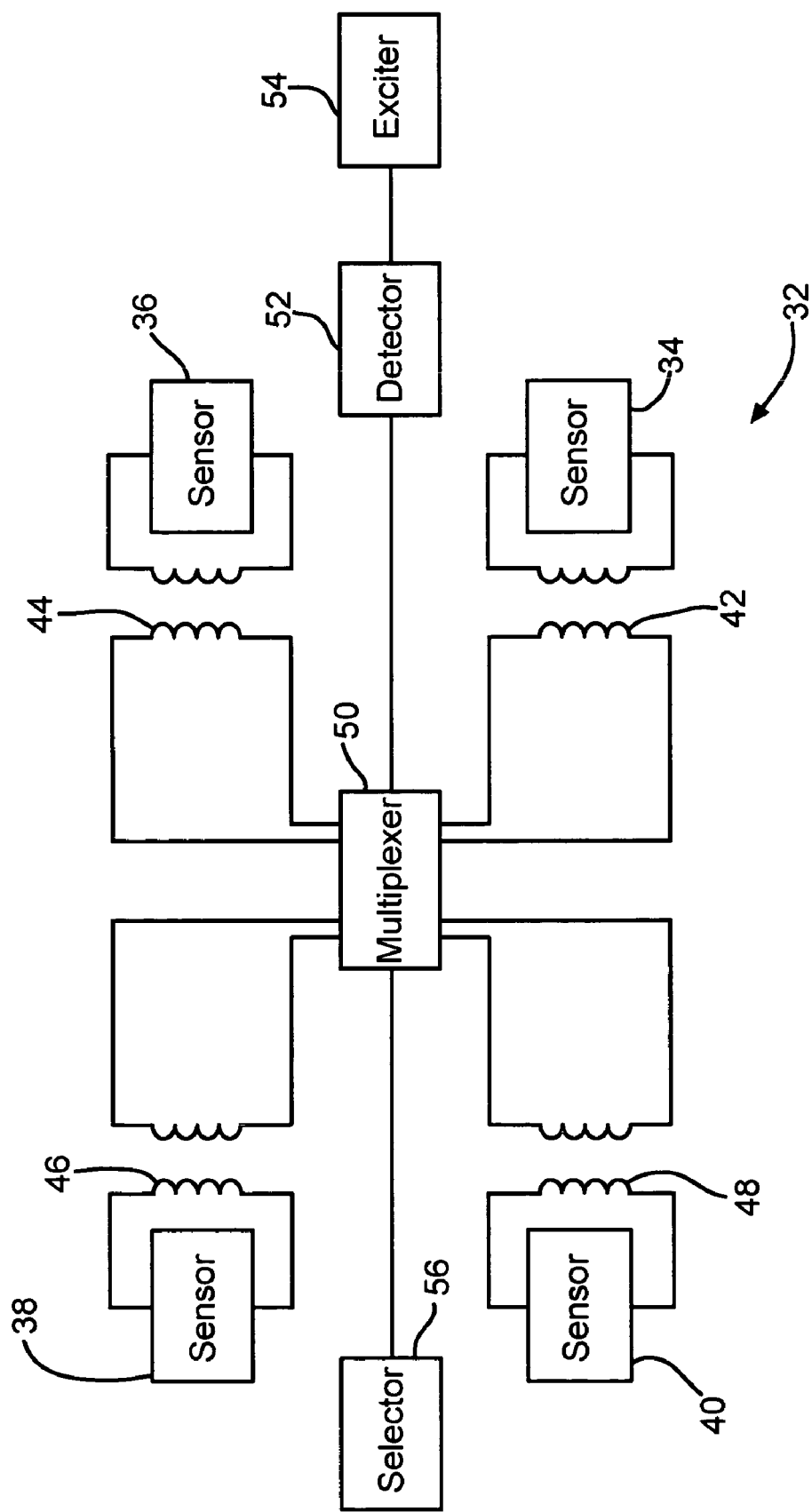
FIG. 3 is a schematic representation of the system applied to a four wheeled vehicle in a configuration that will identify the condition of each sensor independently of the condition of the other three sensors.

Referring now to FIG. 3, a system, indicated generally at 32, for monitoring the tire pressure in four tires of a vehicle is illustrated schematically. First, second, third and fourth tire sensors 34, 36, 38 and 40 corresponding generally with sensor 14 (FIG. 1) are provided in the system 32. Each sensor is associated with a corresponding transceiver antenna coil. First sensor 34 is adjacent to a first transceiver antenna coil 42. Second sensor 36 is adjacent to a second transceiver antenna coil 44. Third sensor 38 is adjacent to a third transceiver antenna coil 46. Fourth sensor 40 is adjacent to a fourth transceiver antenna coil 48. The transceiver antenna coils 42, 44, 46 and 48 are operably and, preferably sequentially, connected through a multiplexer 50 to a transceiver detector 52 and an exciter 54. The multiplexer 50 is operable to selectively and sequentially connect the detector 52 and the exciter 54 to the various transceiver antenna coils 42, 44, 46 and 48 under the control of a selector 56. The multiplexer 50 provides the capability for a single sensor to be activated or interrogated or polled at a time so that a sensor signal received by a given transceiver antenna can be correlated and associated with a particular tire.

Figure 4:
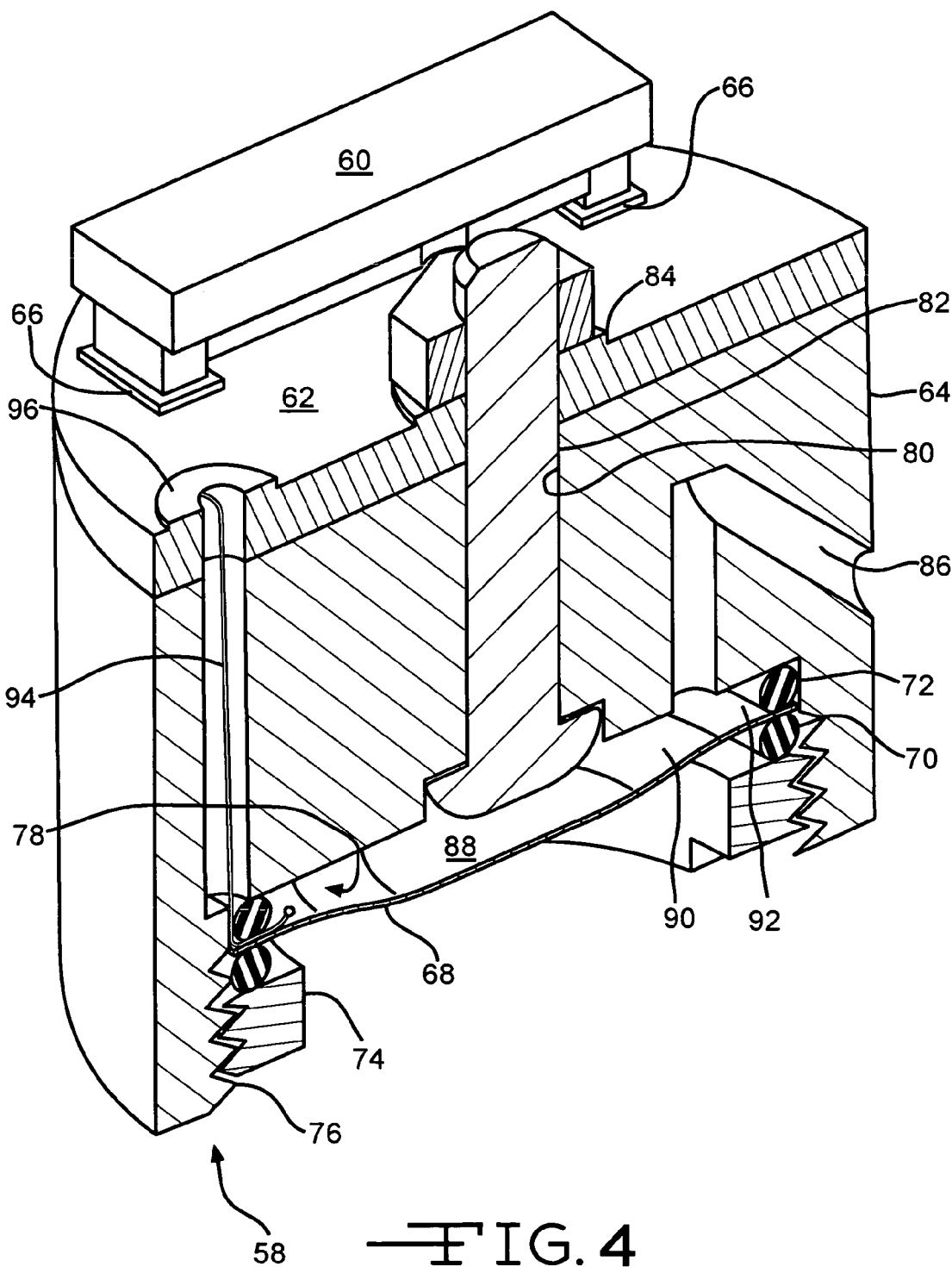
FIG. 4 is a perspective view of a sectioned in-line embodiment of a sensor according to the present invention.
Figure 5:
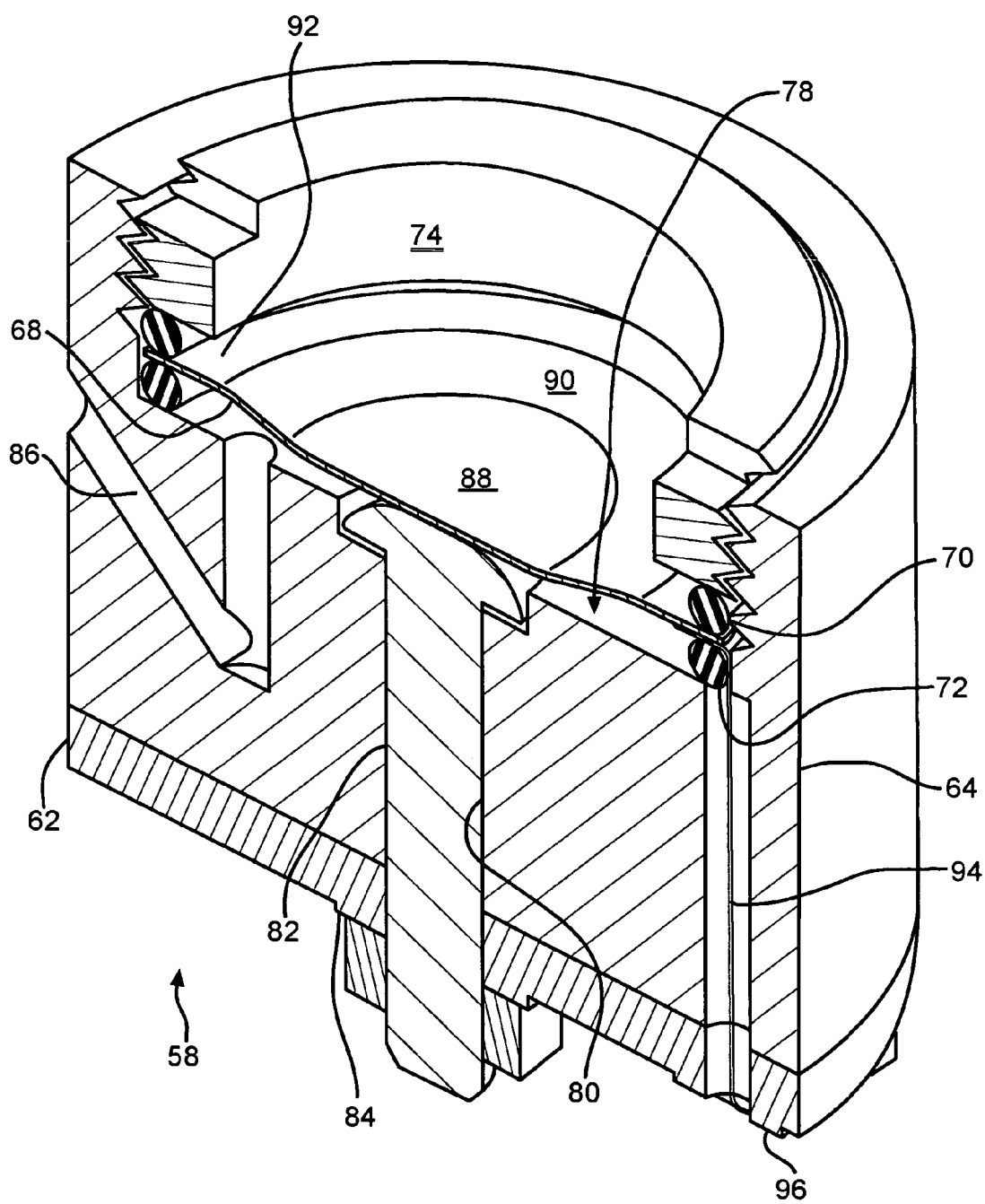
FIG. 5 is another perspective view of the in-line sensor shown in FIG. 4.

Referring now to FIGS. 4 and 5, an embodiment of a sensor according to the present invention is indicated generally at 58. The sensor 58 comprises an antenna coil 60 mounted on a printed circuit board 62 which, in turn, is mounted at one end of a sensor body 64 The printed circuit board 62 includes at least a first capacitor (not shown) and a second capacitor (not shown) although, if desired, one or both capacitors could be mounted outside of the printed circuit board 62. The coil 60 is physically and electrically connected to the printed circuit board 62 at junctions 66.

When a pressure switch in the sensor 58 is in a second state, the first capacitor, which corresponds with the reference capacitor 26 (FIG. 1) and the second capacitor, which corresponds with the condition capacitor 28 (FIG. 1), are electrically connected, parallel with each other and in series with the coil 60. When the pressure switch is in a first state, just the first capacitor is electrically connected in series with the coil 60 in the sensor circuit.

The sensor 58 includes a pressure switch comprising a pressure membrane 68 that is mounted in a cavity in the sensor body 64 between two seals comprising a first O-ring 70 and a second O-ring 72. The membrane 68 and the O-rings 70 and 72 are held in place by an externally threaded ring 74 which cooperates with internal threads 76 in the sensor body 64. The membrane 68 together with the O-ring 72 and an adjacent portion of the sensor body 64 define a reference pressure chamber 78. A central passageway 80 in the sensor body 64 houses a central conductor 82 which is subject to electrical contact with the membrane 68, at one end, and is electrically connected at the other end to the printed circuit board 62 through a junction 84. The central passageway 80 is sealed by or around the central conductor 82 so that the pressure chamber 78 is a sealed chamber except for an initialization passageway 86 that extends from the pressure chamber 78 to the outside of the sensor body 64. Before the sensor 58 is ready for use, the pressure chamber 78 can be pressurized to a reference pressure, through the initialization passageway 86, and the passageway 86 can then be sealed so that the reference pressure is maintained in the pressure chamber 78.

The membrane 68 is a bi-stable, snap action diaphragm membrane, so-called because of its properties when it is exposed to pressure differentials on either side of it. In service, the membrane will be exposed, on one side, to the pressure in the reference pressure chamber 78 and, on the other side, to ambient pressure prevailing inside of a tire. The membrane 68 has a central region 88 that is generally flat and is surrounded by an extremely shallow, conically-shaped region 90. Outside of the region 90, there is another, generally flat, ring-shaped region 92. The membrane is preferably made of a conductive material and, preferably, a springy, corrosion-resistant material such as stainless steel having a minimal thickness, such as about two thousandths of an inch, so that it is very flexible. With the perimeter of the membrane 68 constrained between the O-rings 70 and 72, the membrane 68 will try to assume one of two neutral positions or states for it. One neutral position or state, referred to herein as the first state, is shown in FIG. 4 where the central region 88 is spaced from the central conductor 82. In the other neutral position or state, referred to hereinafter as the second state, the central region 88 of the membrane 68 is in contact with the central conductor 82, as shown in FIG. 5.

It is preferred that the membrane 68 be conductive, as shown in FIGS. 4 and 5. The membrane 68 cooperates with the sensor circuit to determine whether or not the condition capacitor (not shown) will be in or out of the sensor circuit. The membrane 68 is electrically connected to the printed circuit board 62 through a conductor 94 that extends from a printed circuit board junction 96 to the membrane 68. When the pressure membrane 68 is in the second state, it contacts the central conductor 82 and the printed circuit board junctions 84 and 96 are electrically connected. In this case, the condition capacitor will be in the sensor circuit in parallel with the reference capacitor. Pressure inside of the tire acting on one side of the membrane 68, when high enough, will maintain the membrane 68 in the second position or state. When the pressure in the tire is no longer high enough to maintain the membrane in the second position or state, the membrane 68 will snap into the first position or state, electrically disconnecting junctions 84 and 96 and preventing the condition capacitor from acting in parallel with the reference capacitor, thereby changing the resonant frequency of the sensor circuit from the reference resonant frequency to the condition resonant frequency. The sensor 58 can be designed so that the membrane 68 will snap from the second position or state into the first position or state at a desired threshold, for example, 75 percent of the recommended tire pressure as required under the TREAD Act. One important characteristic of the sensor 58 and, specifically, the membrane 68 in the sensor 58, is that once the membrane 68 snaps into the first position or state, it will maintain that position or state despite fluctuations in the pressure inside of the tire. In other words, oscillation of the membrane between positions or states, at or near the threshold pressure, is positively avoided by the snap action membrane. It can be designed to stay in the first position or state even when the pressure in the tire increases by one, two, three or more psig. There would be some advantage if the sensor membrane was designed to snap back from the first position or state to the second position or state when the pressure in the tire reaches the recommended tire pressure, thereby changing the sensor 58 back to the second state indicating that the tire pressure is okay.

An alternative embodiment of a sensor according to the invention is indicated at 100 in FIG. 6. The sensor 100 comprises a housing 102 with a central aperture or bore 104 for housing a valve (not shown) for inflating a tire associated with the sensor. A valve would extend through the bore 104, downwardly in FIG. 6, and extend out of the rim on which the sensor was mounted so that the housing 102 would be positioned inside of the rim. The sensor 100 further comprises a pressure switch indicated generally at 106 and comprising a snap action pressure membrane 108. A sensor antenna coil 110 is mounted on the opposite side of the central aperture 104 from the pressure switch and it is electrically connected to a reference capacitor 112. A condition capacitor (not shown) is housed within the housing 102 and is connected in the manner described above with reference to FIGS. 4 and 5 for the condition capacitor. In fact, the sensor 100 operates just the same way as the sensor 58 (FIGS. 4 and 5).

It will be appreciated that various changes and modifications are possible from the specific details of the invention shown in the attached drawing figures and described above with reference thereto, and such changes and modifications can be made without departing from the spirit thereof as defined in the attached claims. For example, in place of a snap action membrane, a pressure switch membrane might be stable in three positions and the third position might enable or disable an additional circuit component to provide a further signal indicating the state of the pressure switch. For example, a second condition capacitor might be employed in a sensor circuit in a sensor having a tri-stable pressure membrane. Further, the sensor can take other forms not specifically described herein. The sensor can be mounted on the rim of a tire, on or with a valve for the tire or otherwise so long as ambient pressure inside of the tire is in communication with one side of the pressure membrane.

We claim:

1. A tire pressure monitoring system tire pressure sensor comprising
   a sensor circuit comprising
      an antenna coil,
      a first capacitor,
      a second capacitor,
      a pressure switch comprising a pressure membrane supported so that a first side of the membrane is positioned for exposure to the ambient pressure inside of the tire when mounted therewith, said pressure membrane having a snap action in moving from a first state to a second state when a first pressure threshold on one side of it is reached and a snap action in moving from the second state to the first state when a second pressure threshold on one side of it is reached and wherein the second pressure threshold is at least five percent greater or less than the first pressure threshold and
   means operable to electrically connect said second capacitor in parallel with said first capacitor in said sensor circuit when said membrane is in said second state so that said circuit will have a first resonant frequency and means operable to electrically disconnect said second capacitor from said sensor circuit when said membrane is in said first state so that said sensor circuit has a second resonant frequency that is different than said first resonant frequency.

2. The sensor claimed in claim 1 wherein a second side of said pressure membrane is exposed to a reference pressure established in a reference pressure chamber.

3. The sensor claimed in claim 1 wherein at least a portion of said pressure membrane is electrically conductive.

4. The sensor claimed in claim 1 wherein said first resonant frequency is less than the second resonant frequency.

5. A vehicle tire pressure monitoring system comprising a sensor and a transceiver, said sensor comprising
   a sensor circuit comprising
      an antenna coil,
      a first capacitor,
      a second capacitor,
      a pressure switch comprising a pressure membrane supported so that a first side of the membrane is positioned for exposure to the ambient pressure inside of the tire when mounted therewith, said pressure membrane having a snap action in moving from a first state to a second state when a first pressure threshold on one side of it is reached and a snap action in moving from the second state to the first state when a second pressure threshold on one side of it is reached and wherein the second pressure threshold is at least five percent greater or less than the first pressure threshold and
   means operable to electrically connect said second capacitor in parallel with said first capacitor in said sensor circuit when said membrane is in said second state so that said circuit will have a first resonant frequency and means operable to electrically disconnect said second capacitor from said sensor circuit when said membrane is in said first state so that said sensor circuit has a second resonant frequency that is different than said first resonant frequency,
   said transceiver comprising
      an antenna coil,
      an exciter and
      a detector,
   said exciter being operable when in the vicinity of the sensor to cause a current to flow in the sensor circuit and said detector being operable to demodulate signals produced when current is induced to flow in the sensor circuit and to generate a signal reflective of whether the resonant frequency of the sensor circuit is the first resonant frequency or the second resonant frequency.

6. The system claimed in claim 5 wherein said first resonant frequency is less than the second resonant frequency.

7. The system claimed in claim 5 wherein a sensor is provided for each vehicle wheel and a transceiver antenna coil is provided for each wheel.

8. The system claimed in claim 7 which further comprises a multiplexer operable to sequentially connect said transceiver antenna coils to said detector and said exciter.

9. The system claimed in claim 5 wherein said detector is further operable to generate a signal in the case where no resonant frequency for the sensor circuit is detected.

10. A vehicle with pneumatic tires and a tire pressure monitoring system, said system comprising a sensor and a transceiver, said sensor comprising a sensor circuit comprising
an antenna coil,
a first capacitor,
a second capacitor,
a pressure switch comprising a pressure membrane supported so that a first side of the membrane is positioned for exposure to the ambient pressure inside of the tire when mounted therewith, said pressure membrane having a snap action in moving from a first state to a second state when a first pressure threshold on one side of it is reached and a snap action in moving from the second state to the first state when a second pressure threshold on one side of it is reached and wherein the second pressure threshold is at least five percent greater or less than the first pressure threshold and means operable to electrically connect said second capacitor in parallel with said first capacitor in said sensor circuit when said membrane is in said second state so that said circuit will have a first resonant frequency and means operable to electrically disconnect said second capacitor from said sensor circuit when said membrane is in said first state so that said sensor circuit has a second resonant frequency that is different than said first resonant frequency, said transceiver comprising
an antenna coil,
an exciter and
a detector,
said exciter being operable when in the vicinity of the sensor to cause a current to flow in the sensor circuit and said detector being operable to demodulate signals produced when current is induced to flow in the sensor circuit and to generate a signal reflective of whether the resonant frequency of the sensor circuit is the first resonant frequency or the second resonant frequency.

11. The vehicle claimed in claim 10 wherein said first resonant frequency is less than the second resonant frequency.

12. The vehicle claimed in claim 10 wherein a sensor is provided for each vehicle wheel and a transceiver antenna coil is provided for each wheel.

13. The vehicle claimed in claim 12 which further comprises a multiplexer operable to sequentially connect said transceiver antenna coils to said detector and said exciter.

14. The system claimed in claim 10 wherein said detector is further operable to generate a signal in the case where no resonant frequency for the sensor circuit is detected.

* * * * *